No. 796,035. PATENTED AUG. 1, 1905.
T. DUNCAN.
ELECTRIC METER.
APPLICATION FILED JULY 3, 1901.
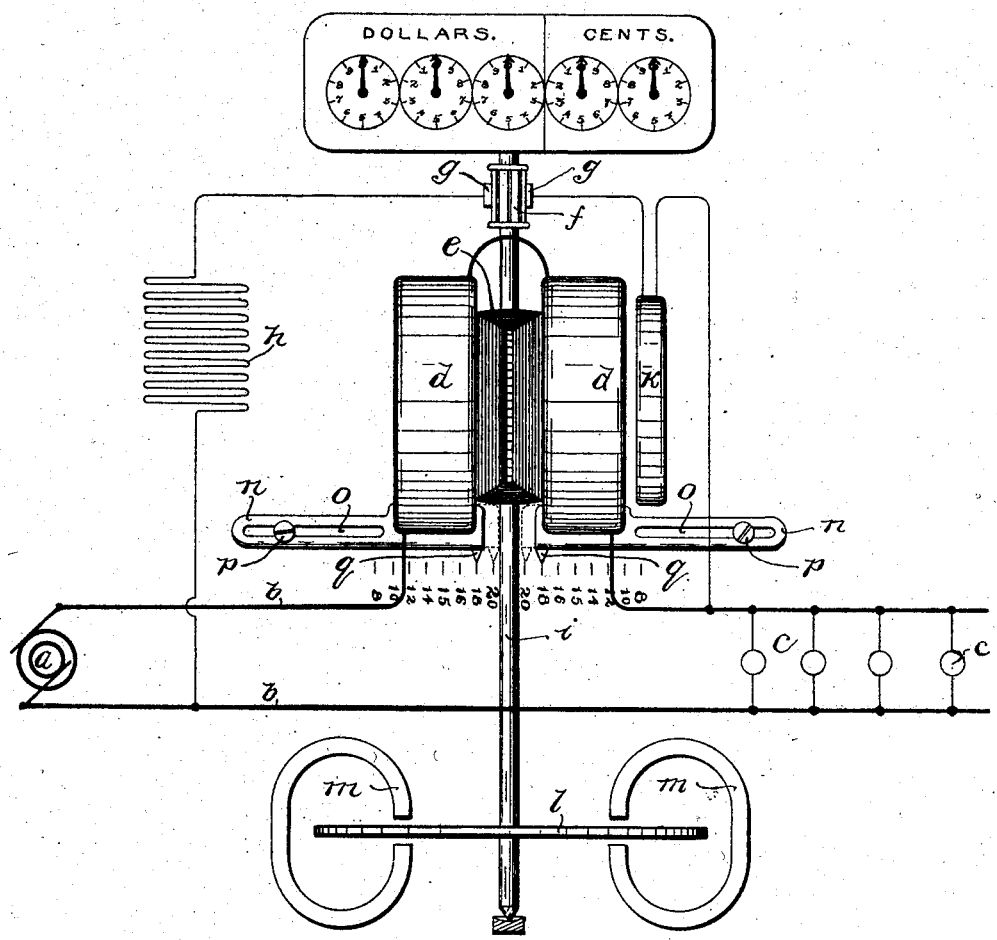

UNITED STATES PATENT OFFICE.

THOMAS DUNCAN, OF CHICAGO, ILLINOIS.

ELECTRIC METER.

No. 796,035.    Specification of Letters Patent.    Patented Aug. 1, 1905.

Application filed July 3, 1901. Serial No. 66,952.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawing, forming a part of this specification.

My invention relates to meters, and has for its object the provision of an improved form of meter whereby the consumer can ascertain without calculation and without special knowledge of the instrument the cost of his service.

Consumers of electrical energy are usually unfamiliar with electrical terms and are not able to check the operations of the meter and the bills for power service, having to trust usually to the accuracy of the inspector taking the readings. This is true because the dial of the instrument is marked in terms of electrical energy, as ampere-hours, lamp-hours, watt-hours, kilowatt-hours, or board-of-trade units, the cost of which is calculated by the company. By integrating the money equivalent of the energy consumed mistakes on the part of the company's instrument-readers are avoided and the user is able to satisfy himself from time to time as to the accuracy of the readings, he being thereby relieved of surprise in cost. The consumer may read the instrument day after day in dollars and cents, whereby any apparently-exaggerated increase in the reading of the instrument may be investigated to determine whether the cause is upon the premises of the consumer or a fault of the instrument. He need not wait until the bills for the various periods of service are at hand before making a complaint or ordering an investigation.

In practicing the specific embodiment of my present invention I adjust the torque by providing a physical adjustment between the field portion and armature of the meter, whereby in varying the air-gap between the armature and field portion the required torque is produced. I preferably adjust the current field-winding, the current field-winding being preferably subdivided into two coils, each coil being mounted upon a sliding support provided with an index, a scale being provided for these indexes or pointers, which are marked in the various costs for the current, so that the instrument may be readily adjusted to register the amount of current in a money equivalent, the rate of operation of the meter being adjusted by a movement of the field-coils to the corresponding cost-marks upon the scale.

I will explain my invention more fully by reference to the accompanying drawing, illustrating a system of alternating-current distribution, with the instrument of my invention associated therewith.

I have illustrated an alternating-current generator $a$, supplying current to transmission-mains $b\ b$, that convey current to translating devices $c\ c$, which may be incandescent lamps, motors, or other instrumentalities. I do not wish, however, to be limited to an alternating-current system of distribution, as my invention is equally applicable to other systems of distribution.

In the specific application of the invention illustrated the measuring instrument is in the form of a commutated alternating-current wattmeter provided with field-coils $d\ d$ and an armature $e$ in inductive relation therewith, the fields of the armature and field-coils being in phase when the current and pressure in the working circuit are in phase. The field-coils are in this instance in series with one of the mains $b$, while the armature is provided with a commutator $f$, which engages brushes $g\ g$, that are connected with the mains $b\ b$, and which include the armature in bridge of the transmission-mains, a resistance $h$ being included in the same bridge. Thus in accordance with the well-known practice the field-winding $d$ and the armature $e$ produce fields that are in proportion to the current and pressure, a torque resulting that causes a rotation of the shaft $i$ in proportion to the watts. A starting-coil $k$ is provided for overcoming friction, &c., while the shaft $i$ is provided with a damping-disk $l$, that coöperates with the damping-magnets $m$ to retard the rotation of the shaft.

As indicated by dotted lines in the drawing, the instrument is adjusted for the highest price of current, (in this instance twenty cents,) while in full lines it is shown as being adjusted for eighteen cents. To effect this adjustment of the instrument, the field-coils $d\ d$ are mounted upon slides $n\ n$, which are provided with slots $o\ o$, through which set-screws $p\ p$ are passed, the slots $o\ o$ being at right angles to the shaft of the armature, whereby the coils $d\ d$ may be adjusted toward or from the armature, at the same time preserving their parallel relation with the armature-shaft. When the meter is to be adjusted for the highest cost of the current, the field-coils $d\ d$ are brought very close to the armature to produce the greatest torque, and thereby the greatest speed of the armature-shaft. As the cost of the current is decreased the torque should be lessened, which result is accomplished in the present case by increasing the air-gap effected by moving the coils $d\ d$ away from the armature until the pointers $q\ q$, mounted upon the slides $n\ n$, register with the corresponding value-marks "18 18" upon the scale. As the cost decreases further the slides $n\ n$ are moved to the corresponding value-marks upon the scale. The lower the price the greater the air-gap, the less the torque, and consequently a less speed for the armature-shaft and counting mechanism for a given amount of current.

While I have shown and particularly described a meter in which the measuring mechanism registers in dollars and cents, it will be apparent that my invention may be applied to means for any other system of registration—as, for instance, recording-watt-meters. In such cases the consumer's bill would always be figured at so many watts at a fixed rate per watt, the variation in total cost of current being taken care of by the greater or less reading of the register of watts than the actual number of watts consumed.

While I have herein shown and particularly described the preferred embodiment of my invention, it is obvious that changes may readily be made without departing from the spirit thereof, and I do not, therefore, wish to be limited to the precise disclosure thereof herein set forth; but,

Having thus described my invention, I claim as new and desire to secure by Letters Patent—

1. The combination with a system of electrical distribution, of a meter supplied with current therefrom having current and pressure field-windings, measuring mechanism provided with means for determining the monetary equivalent of the consumed current, the field-winding of the meter being subdivided into a plurality of coils, a sliding mounting for each of the said coils, a pointer being provided for each mounting, a scale marked with various values with which the pointers may register to adjust the torque of the meter, whereby the armature may be run at a speed in proportion to the cost set for the current and to produce a change in rotation of the rotating element of the meter in proportion to the current cost and thereby effect a corresponding operation of the measuring mechanism, and a torque coil or winding furnishing a starting-field for the armature and subject to the pressure, substantially as described.

2. The combination with a system of electrical distribution, of a meter supplied with current therefrom having current and pressure field-windings, measuring mechanism provided with means for determining the quantity of the consumed current, the field-winding of the meter being subdivided into a plurality of coils, a sliding mounting for each of the said coils, a pointer being provided for each mounting, a scale marked with various values with which the pointers may register, to adjust the torque of the meter, whereby the armature may be run at a speed in proportion to the cost set for the current and to produce a change in rotation of the rotating element of the meter in proportion to the current cost and thereby effect a corresponding operation of the measuring mechanism, and a torque coil or winding furnishing a starting-field for the armature and subject to the pressure, substantially as described.

3. The combination with a system of electrical distribution, of a meter supplied with current therefrom having current and pressure field-windings, measuring mechanism, a sliding mounting for a field-winding of the meter, a scale marked with various values, with respect to which the mounting may be adjusted, whereby the speed of the armature may be varied in respect to the watts consumed, substantially as described.

In witness whereof I hereunto subscribe my name this 23d day of May, A. D. 1901.

THOMAS DUNCAN.

Witnesses:
GEORGE L. CRAGG,
HERBERT F. OBERGFELL.